UNITED STATES PATENT OFFICE.

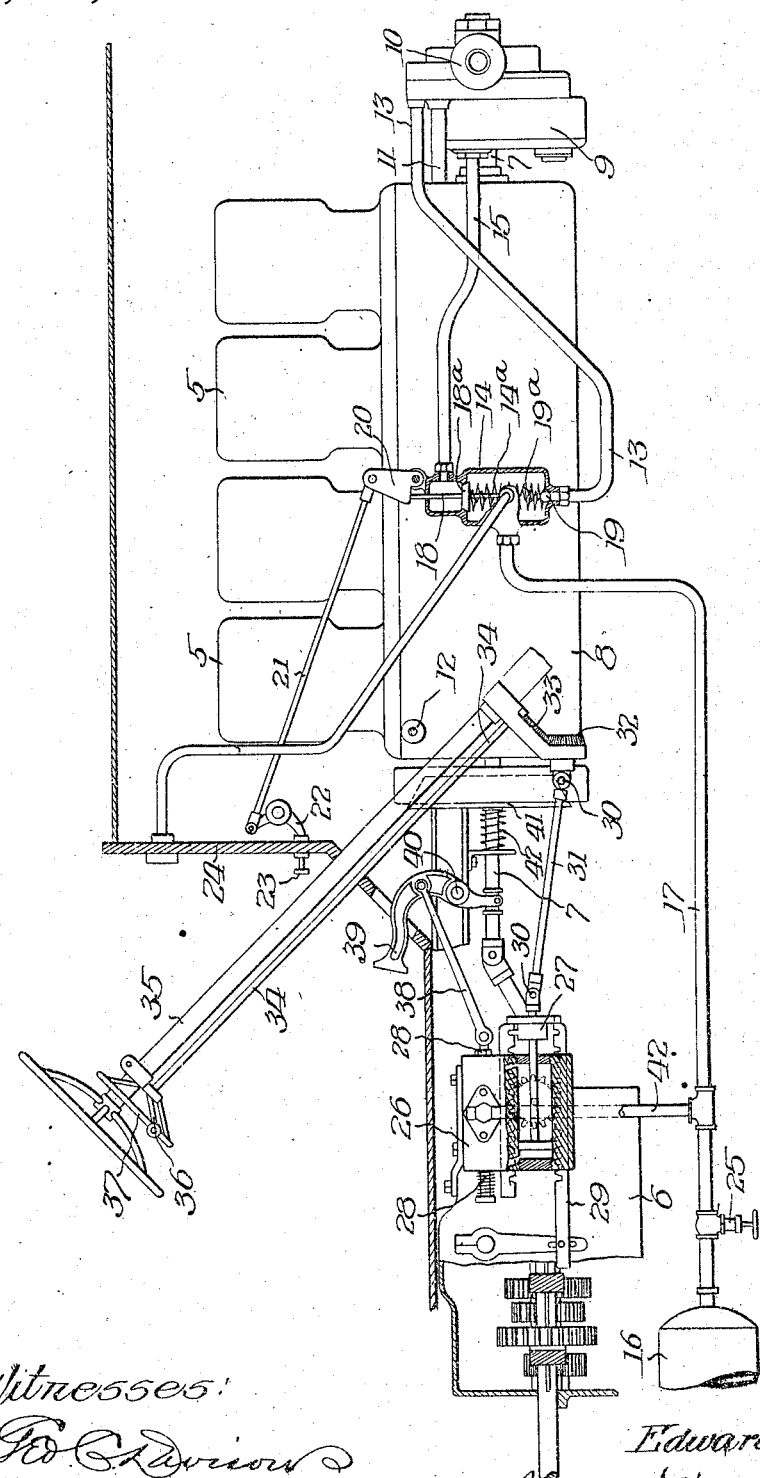

EDWARD E. GRAY, OF PLANO, ILLINOIS, ASSIGNOR TO GRAY PNEUMATIC GEAR SHIFT COMPANY, A CORPORATION OF ILLINOIS.

FLUID-PRESSURE MOTOR AND TRANSMISSION APPARATUS.

1,252,799.  Specification of Letters Patent.  Patented Jan. 8, 1918.

Application filed March 9, 1914. Serial No. 823,302.

*To all whom it may concern:*

Be it known that I, EDWARD E. GRAY, a citizen of the United States, residing at Plano, in the county of Kendall and State of Illinois, have invented certain new and useful Improvements in Fluid-Pressure Motors and Transmission Apparatus, of which the following is a specification.

This invention relates to an apparatus for controlling gear shifting mechanism and a motor therefor by fluid under pressure, whereby the motor may be started and the operation of changing the gears may be effected entirely by fluid pressure devices.

The principal object of the invention is to provide apparatus of this kind which is simple to control and effective and efficient in operation.

A further object of the invention is to provide a control system of this kind which is particularly adapted for use in connection with a motor vehicle by means of which the motor can be started by fluid pressure device controlled from the dash of the vehicle, and the transmission gears may be shifted into and out of different driving engagements by a fluid pressure device controlled from the steering post or any other suitable or convenient part, and a fluid pressure device which is operated by the motor to maintain a supply of fluid under pressure in a suitable reservoir.

For the attainment of these ends and the accomplishment of other new and useful objects, as will appear, the invention consists in the features of novelty in the construction, combination and arrangement of the several parts generally shown in the accompanying drawings and described in the specification, but more particularly pointed out in the appended claims.

In the drawings a motor and a transmission case are shown diagrammatically to which are applied the various devices and parts which constitute the present invention.

It is common practice at the present time to employ a starter, either pneumatic or electric, in connection with the combustion engine of a motor vehicle. With a pneumatic system it is also necessary to provide a compressor of some kind either as a separate device or to so adapt a pneumatic starter that it may be used both as a starter and a compressor. In the present invention a fluid pressure gear shifting mechanism has been added by means of which the shiftable gears may be moved into and out of their different driving engagements by means of a fluid pressure device operated from the same source of supply, and the starting device for the motor may be controlled from the driver's seat of the vehicle in the easiest possible manner.

In the present embodiment of my invention, a motor 5 is connected with transmission mechanism in a transmission case 6, in the well known manner.

An engine shaft 7 extends through a crank case 8 and to it is connected a pneumatic starter device 9 and a compressor 10. The starter comprises a one-way clutch (not shown) of any well known construction, and the compressor is preferably connected to one face of the starter so that it occupies the least possible space. An intake pipe 11 for the compressor is connected to the crank case 8 above the oil level therein so that the compressor may be lubricated by the oil contained in the air, the crank case being provided with a separate air inlet 12 to afford a circulation of air through the crank case. A compressor discharge pipe 13 is connected to a valve 14. The starter 9 is also connected to the valve 14 by means of a pipe 15, and a reservoir 16 is connected to the valve by means of a pipe 17. This valve 14 is provided with a valve stem 18 carrying a valve $18^a$ which is opened against the pressure of valve spring $14^a$ to admit fluid under pressure from the supply reservoir 16 to the starter. The valve is also provided with a check 19 pressed in position by a spring $19^a$ disposed inside the valve spring $14^a$ and held in place by the valve stem 18, the check 19 covering the discharge from the air compressor, so that the compressed air is admitted ssure through the check to the sup-
'oir 16 but not to the starter un-
irter valve 18ᵃ happens to be open.
l the valve stem 18 a member 20 is
by means of a rod 21 to a pivoted
22 provided with a push button
dash 24. When the button 23 is
: valve 18ᵃ is opened to admit fluid
sure from the reservoir 16 to the
A hand-valve 25 may also be pro-
ferably adjacent the storage res-
y means of which the fluid under
 the reservoir may be shut off
pparatus is not in use, from any
ough the valves 14 or the other tion with the gear case 6 and con-
ie shiftable gears of the trans-
:hanism is a fluid pressure gear
ice designated generally by the
imeral 26 and comprising a ro-
ting member 27, a valve 28 and
: shiftable rods 29 which con-
ement of the shiftable gears in
iwn manner. Connected to the
y means of universal joints 30
1 is a pinion 32, and meshing
n is a gear segment 33 mounted
which extends upwardly on a
35 and is provided at its upper
arm 36 movable over an indi-
r quadrant 37.
to the valve 28 by means of a
lutch pedal 39 mounted on a
he movement of the clutch
ates the clutch 41 against the
tch spring 42 and operates the
e fluid pressure gear shifting
opening or closing a connec-
: fluid pressure reservoir 16
pes 17, and through a pipe 42
cting device 27 is actuated by
essure to engage and opera-
e gear shifting rod 29 in ac-
the position of the selector
e clearly set forth in the ap-
iding application Serial No.
1 the United States Patent
ut July 11, 1912.
 with the engine at rest the
s operated, which opens con-
: reservoir 16 by means of the
through the valve 18ᵃ to the
n the engine is started the
itomatically uncoupled by
-way clutch and the select-
ived to place the selector 27
fect-ascertain driving con-
ieda depressed, which
:8 to return any previously
ieutral position, and the re-
f the pedal effects the cor-
nent of the valve 28 which
on from the reservoir 16 to the fluid pressure gear shifting device 26
causing it to operate mechanism to shift one
of the gears previously selected for opera-
tion by means of the selecting mechanism.
After the engine has been started the com-
pressor 10 is operated continuously to re-
plenish the supply of fluid under pressure
through the valve 14 to the supply reservoir
16, and the head or press    e fluid is
shown by means of an in        42 on the
dash 24 connected with the valve 14 by means
of a pipe 43.

It is obvious that this apparatus or system
of fluid pressure        is independent of
the specific construction of any of its parts
and no specific construction of the starter
compressor or gear shifting device is there-
fore shown.

What I claim is:

1. In fluid pressure starter and compres-
sor mechanism for automobile engines; the
combination with a fluid pressure reservoir;
of a common housing having a separate
tubular connection with the starter, the com-
pressor, and the reservoir; a valve in the hous-
ing to admit fluid under pressure from the
compressor through the housing to the
reservoir; and another valve in the housing
to admit fluid under pressure from the
reservoir through the housing to the starter.

2. In fluid pressure starter and compres-
sor mechanism for automobile engines; the
combination with a fluid pressure reservoir;
of a common housing having a separate
tubular connection with the starter, the com-
pressor, and the reservoir; and a double
valve in the housing comprising a check
valve between the compressor and reservoir
connection, and a single manually operable
valve between the starter and reservoir.

3. In fluid pressure starter and compres-
sor mechanism for automobile engines; the
combination with a fluid pressure reservoir;
of a housing having a chamber connected
at one end with the starter, at the other end
with the compressor, and intermediate the
ends with the reservoir; and a double
spring-pressed valve in the housing com-
prising a check valve for the compressor
connection and manually operable valve for
the starter connection.

4. In fluid pressure starter and compres-
sor mechanism for automobile engines; the
combination with a fluid pressure reservoir;
of a housing having a chamber connected
at one end with the starter, at the other end
with the compressor, and intermediate the
ends with the reservoir; a check valve for
the compressor connection; a manually op-
erable valve for the starter connection; and
a spring between the valves tending to keep
them both closed.

5. In a fluid pressure starter and com-
pressor mechanism for automobiles, the combination with a valve housing, of a starter and a compressor connected to the housing at opposite ends and a reservoir connected to the housing between the opposite ends, and a check valve in the housing between the reservoir and the compressor and a manually operable valve in the housing between the reservoir and the starter.

In testimony whereof I have signed my name to this specification, in the presence of two subscribing witnesses, on this 17th day of February, A. D. 1914.

EDWARD E. GRAY.

Witnesses:
KENT W. WONNELL,
ALLENA OFFUTT.